United States Patent
Schwarz

(10) Patent No.: US 8,843,766 B2
(45) Date of Patent: Sep. 23, 2014

(54) METHOD AND SYSTEM FOR PROTECTING AGAINST ACCESS TO A MACHINE CODE OF A DEVICE

(75) Inventor: Konrad Schwarz, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 717 days.

(21) Appl. No.: 12/679,758

(22) PCT Filed: Aug. 28, 2008

(86) PCT No.: PCT/EP2008/061279
§ 371 (c)(1),
(2), (4) Date: Mar. 24, 2010

(87) PCT Pub. No.: WO2009/040207
PCT Pub. Date: Apr. 2, 2009

(65) Prior Publication Data
US 2010/0205459 A1    Aug. 12, 2010

(30) Foreign Application Priority Data
Sep. 25, 2007 (DE) .......................... 10 2007 045 743

(51) Int. Cl.
*G06F 21/00* (2013.01)
*H04L 9/08* (2006.01)
*G06F 21/55* (2013.01)

(52) U.S. Cl.
CPC .................................. *G06F 21/554* (2013.01)
USPC ........................................ 713/190; 380/277

(58) Field of Classification Search
CPC ..... G06F 12/1408; G06F 21/72; G06F 21/14; G06F 21/123; G06F 21/125
USPC .......... 713/189, 190, 172, 175, 193; 380/264, 380/277
See application file for complete search history.

(56) References Cited

U.S. PATENT DOCUMENTS

| | | | |
|---|---|---|---|
| 6,477,540 B1 * | 11/2002 | Singh et al. ........................... | 1/1 |
| 6,647,495 B1 * | 11/2003 | Takeuchi et al. .............. | 713/189 |
| 6,820,200 B2 | 11/2004 | Takeuchi et al. .............. | 713/179 |
| 2002/0055910 A1 | 5/2002 | Durbin ............................ | 105/64 |
| 2005/0114683 A1 | 5/2005 | Jin et al. ........................ | 713/187 |
| 2005/0182952 A1* | 8/2005 | Shinozaki ..................... | 713/189 |
| 2008/0114989 A1* | 5/2008 | Anbalagan et al. ........... | 713/189 |

FOREIGN PATENT DOCUMENTS

| | | | |
|---|---|---|---|
| EP | 0875815 | 11/1998 | ................ G06F 1/00 |
| WO | 2006134304 | 12/2006 | ................ G06F 1/00 |

OTHER PUBLICATIONS

Sundeep Bajikar, Trusted platfrom module based secuirty on NOtebook pCs—white paper, intel corporation, Jun. 20, 2002, p. 1-20.*
International Search Report and Written Opinion for Application No. PCT/EP2008/061279 (16 pages), Mar. 3, 2009.

(Continued)

*Primary Examiner* — Abu Sholeman
(74) *Attorney, Agent, or Firm* — King & Spalding L.L.P.

(57) ABSTRACT

A method for the protection against access to a machine code of a device, has the steps: (a) encrypting a machine code by a device-specific key, which is provided by a TPM (Trusted Platform Module) module present in the device, (b) storing the encrypted machine code in a memory of the device, (c) wherein the device-specific key can no longer be read from the TPM module after a manipulation of the device.

17 Claims, 3 Drawing Sheets

(56) References Cited

OTHER PUBLICATIONS

Trusted Computing Group, Trusted Platform Module = hardware device which becoming standard with pc-class machines 2007 htp://www.trustedcomputinggroup.org/groups/tpm/ (1 page), Jul. 16, 2007.

Bajikar, "Trusted Platform Module (TPM) Based Security on Notebook PCs—White Paper", Internet Citation, http://www.intel.co/design/mobile/platform/downloads/trusted_platform_module_white_paper.pdf (20 pages), Jun. 20, 2002.

FIPS PUB, Federal Information Processing Standards Publication: Security Requirements for Cryptographic Modules, U.S. Department of Commerce, Washington DC pp. 1-55 (56 pages), Jan. 11, 1994.

Trusted Computing Platform Alliance (TCPA) Main Specification Version 1.1b, TCPA Main Specification pp. 1-332 (332 pages), Feb. 22, 2009.

* cited by examiner

METHOD AND SYSTEM FOR PROTECTING AGAINST ACCESS TO A MACHINE CODE OF A DEVICE

CROSS-REFERENCE TO RELATED APPLICATIONS

This application is a U.S. National Stage Application of International Application No. PCT/EP2008/061279 filed Aug. 28, 2008, which designates the United States of America, and claims priority to German Application No. 10 2007 045 743.1 filed Sep. 25, 2007, the contents of which are hereby incorporated by reference in their entirety.

TECHNICAL FIELD

The invention relates to a method and system for protecting a machine code, for example a Java bytecode, against unauthorized access by a third party.

BACKGROUND

Java is an object-oriented programming language developed by Sun Microsystems initially for the internet. However Java is now used as a universal programming language. In Java all program objects are defined in what are known as classes. One characteristic of Java is that executable Java programs are totally portable. This is achieved in that the Java compiler generates an architecture-neutral so-called Java bytecode, rather than a machine code that is specific to a computer architecture. This Java bytecode is interpreted during execution of the Java program or is translated during execution into the architecture-specific machine code of the respective CPU by a JIT (Just In Time) compiler. Any dependency on the respective operating system or the respective window interface is largely avoided with Java by the use of program libraries.

With conventional devices, which use Java source files, the Java code or Uni code is compiled by a compiler and stored in a memory of the device, which is a control computer for example. The Java object files (.-Class files) stored in the memory can be read relatively easily and decompiled for reverse engineering purposes by unauthorized third parties after the device has been delivered or circulated.

SUMMARY

According to various embodiments, a method and system for protecting against unauthorized access to a machine code of a device can be created.

According to an embodiment, a method for protecting against access to a machine code of a device, may comprise the following steps: (a) encrypting a machine code by means of a device-specific key, which is provided by a TPM (Trusted Platform Module) module contained in the device, (b) storing the encrypted machine code in a memory of the device, (c) wherein it no longer being possible for the device-specific key to be read from the TPM module after a manipulation at the device.

According to a further embodiment, the machine code (MC) can be formed by a Java bytecode. According to a further embodiment, the device-specific key can be formed by an AIK (Attestation Identity Key) key of the TPM module. According to a further embodiment, a class loader of a Java Virtual Machine may decrypt the encrypted machine code stored in the memory of the device by means of the device-specific key read from the TPM module and supplies it to an execution unit. According to a further embodiment, the device-specific key can be transmitted by the TPM module by way of a network to an encryption unit, which encrypts the machine code by means of the device-specific key. According to a further embodiment, the decrypted machine code can be executed or interpreted by the execution unit. According to a further embodiment, the machine code can be formed by MP3 data. According to a further embodiment, encrypted MP3 data can be decrypted by means of a device-specific key read from the TPM module and supplied to an MP3 decoder.

According to another embodiment, in a system for protecting against access to a machine code of a device, the machine code is encrypted by means of a device-specific key, which is provided by a Trusted Platform Module (TPM) module contained in the device, and stored in a memory of the device, wherein it is no longer being possible for the device-specific key to be read from the TPM module after a manipulation at the device.

According to yet another embodiment, a device with access-protected machine code, may comprise: (a) a memory for storing an encrypted machine code; (b) a class loader for decrypting the encrypted machine code by means of a device-specific key read from a TPM module; and (c) an execution unit to execute the decrypted machine code; (d) the device-specific key being blocked by the Trusted Platform Module (TPM) module after a manipulation at the device.

According to a further embodiment of the device, the memory can be a nonvolatile memory. According to a further embodiment of the device, the nonvolatile memory may have a hard disk. According to a further embodiment of the device, the execution unit can be provided in a JVM (Java Virtual Machine). According to a further embodiment of the device, the execution unit can be a decoder.

According to yet another embodiment, a program with program commands may implement the method as described above.

According to yet another embodiment, a data medium may store the program as described above.

BRIEF DESCRIPTION OF THE DRAWINGS

Preferred embodiments of the method and the system for protecting against access to a machine code are described below with reference to the accompanying figures to explain the various features of the invention.

In the figures.

DETAILED DESCRIPTION

Figure 1:
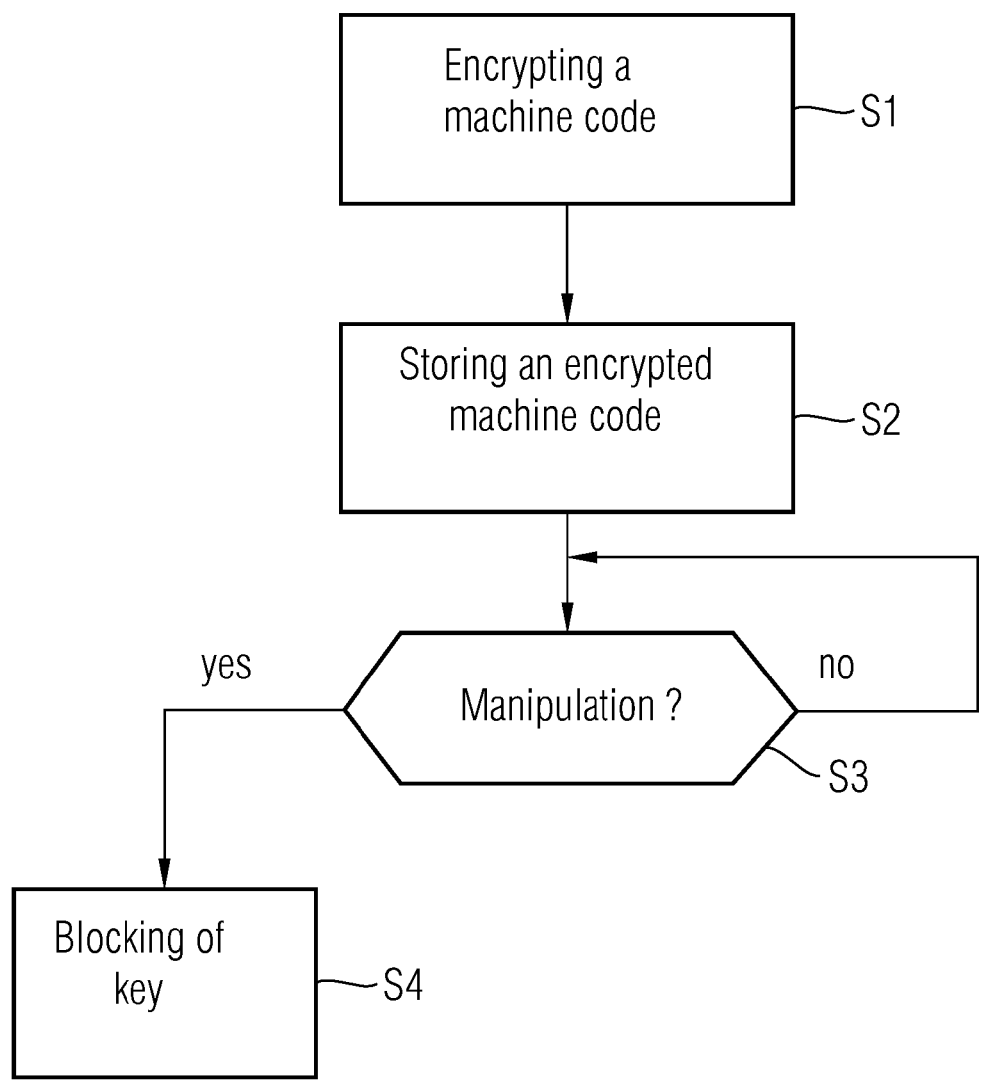
FIG. 1 shows a flow diagram illustrating one embodiment of the method.

According to various embodiments, a method may protect against access to a machine code of a device, by the following steps:

(a) encrypting a machine code by means of a device-specific key, which is provided by a TPM (Trusted Platform Module) module contained in the device, (b) storing the encrypted machine code in a memory of the device, (c) it no longer being possible for the device-specific key to be read from the TPM module after a manipulation at the device.

In one embodiment of the method the machine code is formed by a Java bytecode.

In one embodiment of the method, the device-specific key is formed by an AIK (Attestation Identity Key) key of the TPM module.

In one embodiment of the method a class loader of a Java Virtual Machine decrypts the encrypted machine code stored in the memory of the device by means of the device-specific key read from the TPM module and supplies the decrypted machine code to an execution unit of the device.

In one embodiment of the method the device-specific key is transmitted by the TPM module by way of a network to an encryption unit, which encrypts the machine code by means of the device-specific key. This encryption unit can also be located in the device.

In one embodiment of the method the decrypted machine code is executed or interpreted by the execution unit of the device.

In one embodiment of the method the machine code is formed by MP3 data.

In one embodiment of the method encrypted MP3 data is decrypted by means of a device-specific key read from the TPM module and supplied to an MP3 decoder of the device.

According to further embodiments, a system for protecting against access to a machine code of a device can be created, wherein the machine code is encrypted by means of a device-specific key, which is provided by a TPM module contained in the device, and stored in a memory of the device, it no longer being possible for the device-specific key to be read from the TPM module after a manipulation at the device.

According to yet other embodiments, a device with access-protected machine code, has:

(a) a memory for storing an encrypted machine code MC;

(b) a class loader for decrypting the encrypted machine code by means of a device-specific key read from a TPM module; and having (c) an execution unit to execute the decrypted machine code;

(d) the device-specific key being blocked by the TPM module after a manipulation at the device.

In one embodiment of the device the memory is a nonvolatile memory.

In one embodiment of the device the nonvolatile memory has a hard disk.

In one embodiment of the device the execution unit is provided in a JVM (Java Virtual Machine).

In one embodiment of the device the execution unit is a decoder.

According to yet other embodiments, a program with program commands for implementing a method for protecting against access to a machine code of a device can be created having the following steps:

(a) encrypting a machine code by means of a device-specific key, which is provided by a TPM (Trusted Platform Module) module contained in the device, (b) storing the encrypted machine code in a memory of the device, (c) it no longer being possible for the device-specific key to be read from the TPM module after a manipulation at the device.

According to yet other embodiments, a data medium for storing a program with program commands for implementing a method for protecting against access to a machine code of a device can be provided, having the following steps:

(a) encrypting a machine code by means of a device-specific key, which is provided by a TPM (Trusted Platform Module) module contained in the device, (b) storing the encrypted machine code in a memory of the device, (c) it no longer being possible for the device-specific key to be read from the TPM module after a manipulation at the device.

The method according to various embodiments is provided to protect against access to a machine code of a device, in order in particular to prevent the reading of files and their decompilation for reverse engineering purposes.

The machine code can be a Java bytecode for example. Java programs are first compiled after their creation. The so-called bytecode is created in this process.

A Java Virtual Machine (JVM) consists of computer programs and data structures, which implement a specific virtual machine model. This virtual machine model accepts in Java intermediate code or Java bytecode, which is generated by the Java compiler. The Java Virtual Machine is software, which is developed individually for each platform and is available for almost every conceivable combination of operating system and hardware. The JVM virtual machine represents an interface between the platform-independent Java bytecode and the system on which said Java bytecode is executed. The Java source text of a Java program is first compiled and then the generated bytecode is interpreted by the JVM virtual machine on a destination computer. This has the advantage of portability and platform-independence of the Java source text. Other systems also use intermediate codes, which are then interpreted. Java bytecode or MSIL (Microsoft Intermediate Language) can be generated on different platforms not only based on the same language but also based on different languages.

As shown in FIG. 1, with the method according to various embodiments for protecting against access, a machine code MC, for example a Java bytecode is encrypted in a step S1.

Encryption takes place by means of a device-specific key, which is provided by a TPM module contained in the device. The TPM module (Trust Platform Module) is a chip for example, which is installed in the device. In one possible embodiment the TPM module is active and checks the bootcode before it is executed. The bootcode makes the operating system code available to the TPM module for verification before execution of the operating system.

The operating system also makes the JVM code available to the TPM module for verification before execution of the JVM. This allows manipulations, in particular changes to the code, to be identified.

The TPM module has a unique identifier and serves among other things to identify the device. The TPM module has various keys, specifically a so-called Endorsement Key (EK), which is assigned uniquely to the TPM module, and Attestation Identity Keys (AIK). The TPM module also has a so-called Storage Root Key (SRK), which serves to encrypt further keys used, for example private keys, and therefore represents the root of a TPM key tree. For security reasons the Endorsement Key (EK) can never leave the TPM module, so there cannot be a backup for the Endorsement Key (EK) either. However the Endorsement Key (EK) can be generated externally. The reading of the Endorsement Key can be blocked with a command, this block being final and impossible to cancel.

The Attestation Identity Keys (AIK) can be used for attestation or authentication purposes. The AIK keys are for example RSA keys with a set length of 2048 bits. The AIK keys cannot be migrated and are used by the TPM module to sign or authenticate data. The Attestation Identity Keys (AIK) are provided by the TPM module, because the Endorsement Key (EK) of a TPM module can be used to authenticate platform integrity (attestation). The AIK keys and the TPM module are therefore used for authentication processes and can be produced or generated in any numbers. To ensure that only valid AIK keys are created, such keys can be confirmed by a trusted third party, which can also be referred to as Privacy CA. This confirmation takes place in the form of an AIK certificate (Credential).

The keys are generated, used and stored securely within the TPM module to protect them against software attacks. The TPM module is designed so that a physical manipulation results in the inevitable destruction of the data, in particular the cryptographic keys contained therein.

In step S1 of the method shown in FIG. 1 the machine code MC, for example the Java bytecode, is encrypted in one embodiment by means of an AIK key, which is provided by a TPM module present in the device.

The encrypted machine code is then stored in a memory of the device in step S2. The stored encrypted machine code can only be decrypted if the associated AIK key is available. However this AIK key can only be read, if the TPM module, in which the AIK key is located, is not manipulated.

If it is ascertained in step S3 that a manipulation has taken place at the TPM module, in one possible embodiment the keys contained in the TPM module are irreversibly destroyed and can no longer be read, in other words the key, in particular the AIK key, is blocked in step S4.

Figure 2:
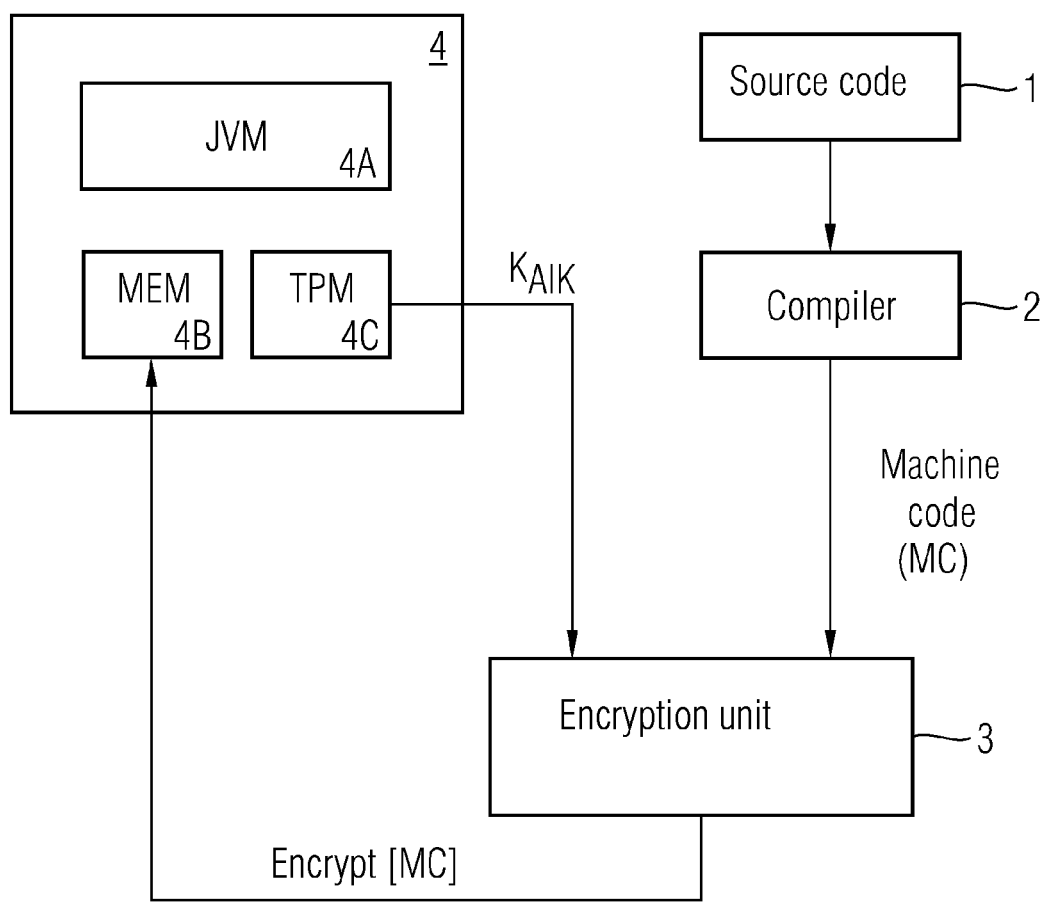
FIG. 2 shows a block circuit diagram to illustrate an encryption process in one embodiment of the method.

FIG. 2 shows a block circuit diagram to explain a possible embodiment of the method.

A compiler 2 compiles a Java source code 1 to generate a Java bytecode or interpretable Uni code or intermediate code. An encryption unit 3 reads a device-specific key K from a device 4.

The device-specific key is for example an AIK (Attestation Identity Key) key. In the exemplary embodiment illustrated in FIG. 2 the device 4 has a Java Virtual Machine 4A, a memory 4B and a TPM module 4C. The memory 4B is for example a nonvolatile memory, which is formed by a hard disk. The device 4 can be a control computer for a plant for example. The encryption unit 3 reads a device-specific AIK key ($K_{AIK}$) from the TPM module 4C of the device 4 and uses said key to encrypt the machine code or Java bytecode. The machine code MC does not necessarily have to be a Java bytecode. In alternative embodiments the machine code can be any machine code MC of any processor, even MP3 data. The machine code encrypted by the encryption unit 3 is written by the encryption unit 3 into the memory 4B of the device 4. The encrypted machine code written into the memory 4B cannot yet be executed in this form and is therefore secure against decompilation for reverse engineering purposes. When the encrypted machine code has been written into the memory 4B of the device 4 the device can be delivered to customers.

An unauthorized third party who does not have the device-specific key cannot decompile the encrypted machine code, for example the encrypted Java bytecode, as it is stored encrypted in the memory 4B. To get to the device-specific key, an unauthorized third party would have to attempt manipulation at the TPM module 4C but the device-specific key is automatically blocked by the TPM module 4C and the key data destroyed in the event of a manipulation at the TPM module 4C.

Figure 3:
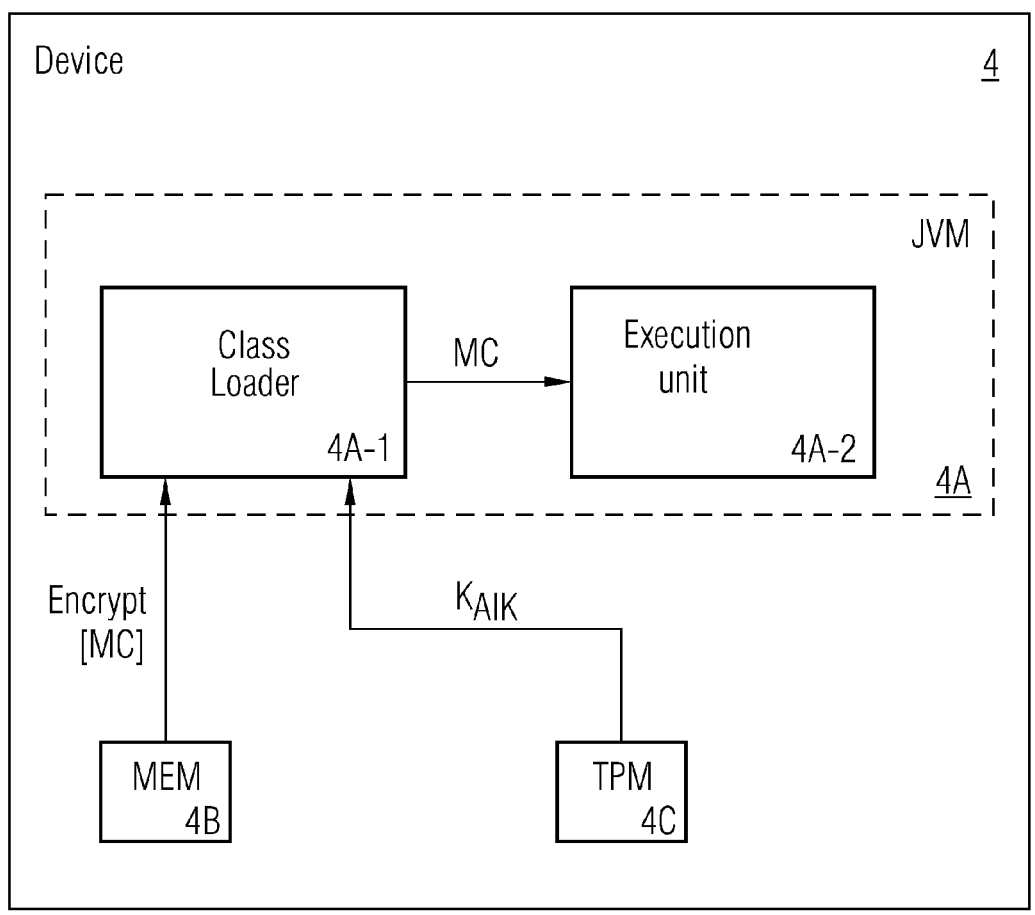
FIG. 3 shows a block circuit diagram of a possible embodiment of a device with access-protected machine code.

FIG. 3 shows a block circuit diagram of the delivered device 4 to explain the decryption of the machine code MC in the hands of an authorized purchaser of the device 4. The JVM machine 4A has a so-called class loader 4A-1 and an execution unit 4A-2. The JVM 4A allows a user-defined class loader to be created and used. The JVM 4A generates an instance of a class, the so-called class loader, as standard. This system class loader can load classes from .-Class files in a local data system.

An application-defined class loader is concatenated to the system class loader either directly or indirectly by way of other class loaders.

By calling up a method load class ( ) a class loader receives the request to load a specific class. The class loader then forwards the inquiry first to a higher-order class loader.

Only if this fails to find the class does the class loader try to load the class itself.

In the device illustrated in FIG. 3 the class loader 4A-1 is a user-defined or application-defined class loader, which can be referred to as a trusted class loader. When the trusted class loader 4A-1 loads a class, it first receives an encrypted form of a file from the memory 4B and then uses the AIK key read from the TPM module 4C to decrypt data from the loaded file. The class loader 4A-1 of the JVM decrypts the encrypted machine code stored in the memory 4B of the device 4, for example the encrypted Java bytecode, by means of the device-specific key read from the TPM module 4C and supplies the decrypted machine code MC to the execution unit 4A-2 of the JVM. When the delivered device illustrated in FIG. 3 is powered up in the hands of a purchaser or customer, the TPM module 4C first checks whether or not a manipulation has taken place. Only if no manipulation has taken place, is the device-specific key ($K_{AIK}$) made available. The user-defined class loader carries out the decryption with the aid of the read device-specific key.

To read in a bytecode, the method Define Class ( ) provided by the class loader is called up, in order to generate a class object from the bytecode. The bytecode is then registered as a class by the Java Virtual Machine JVM.

In one possible embodiment the execution unit 4A-2 is formed by an execution unit provided outside the JVM machine, for example by a CPU.

In a further embodiment the execution unit 4A-2 is formed by a decoder, in particular an MP3 data decoder.

In one possible embodiment the device-specific key is transmitted by the TPM module 4C by way of a network to the encryption unit 3, which encrypts the machine code MC by means of the device-specific key.

What is claimed is:

1. A method for protecting against access to a machine code of a device, comprising the following steps:
    (a) encrypting a machine code by means of a device-specific key, which is formed by an Attestation Identity Key (AIK) key of a Trusted Platform Module (TPM) contained in the device,
    (b) storing the encrypted machine code in a memory of the device,
    (c) requiring the device-specific key in order to decrypt the machine code using a class loader,
    (d) sensing a physical manipulation of the TPM; and
    (e) disabling access to the device-specific key after sensing the physical manipulation of the TPM so that the device-specific key cannot be read from the TPM.

2. The method according to claim 1, wherein the machine code is formed by a Java bytecode.

3. The method according to claim 1, wherein a class loader of a Java Virtual Machine decrypts the encrypted machine code stored in the memory of the device by means of the device-specific key read from the TPM and supplies the machine code to an execution unit.

4. The method according to claim 1, wherein the device-specific key is transmitted by the TPM by way of a network to an encryption unit, which encrypts the machine code by means of the device-specific key.

5. The method according to claim 3, wherein the decrypted machine code is executed or interpreted by the execution unit.

6. The method according to claim 1, wherein the machine code is formed by MP3 data.

7. The method according to claim 6, wherein encrypted MP3 data is decrypted by means of a device-specific key read from the TPM and supplied to an MP3 decoder.

8. A device with access-protected machine code, comprising:
   (a) a memory for storing an encrypted machine code;
   (b) a class loader for decrypting the encrypted machine code by means of a device-specific key formed by an Attestation Identity Key (AIK) key of a Trusted Platform Module (TPM); and having
   (c) an execution unit to execute the decrypted machine code; and
   (d) the TPM operable to sense a physical manipulation of the TPM;
   wherein the device-specific key is blocked by the TPM after sensing the physical manipulation of the TPM at the device.

9. The device according to claim 8, wherein the memory is a nonvolatile memory.

10. The device according to claim 9, wherein the nonvolatile memory has a hard disk.

11. The device according to claim 8, wherein the execution unit is provided in a JVM (Java Virtual Machine).

12. The device according to claim 8, wherein the execution unit is a decoder.

13. A program product comprising a non-transitory data medium for storing program commands, the commands including instructions for:
   (a) encrypting a machine code by means of a device-specific key, which is formed by an Attestation Identity Key (AIK) key of a Trusted Platform Module (TPM) contained in the device,
   (b) storing the encrypted machine code in a memory of the device,
   (c) requiring the device-specific key in order to decrypt the machine code using a class loader,
   (d) sensing a physical manipulation of the TPM; and
   (e) disabling access to the device-specific key after sensing the physical manipulation of the TPM so that the device-specific key cannot be read from the TPM.

14. The program product according to claim 13, wherein the machine code is formed by a Java bytecode.

15. The program product according to claim 13, wherein a class loader of a Java Virtual Machine decrypts the encrypted machine code stored in the memory of the device by means of the device-specific key read from the TPM and supplies it to an execution unit.

16. The program product according to claim 13, wherein the device-specific key is transmitted by the TPM by way of a network to an encryption unit, which encrypts the machine code by means of the device-specific key.

17. The program product according to claim 16, wherein the decrypted machine code is executed or interpreted by the execution unit.

* * * * *